United States Patent [19]
Kondoh et al.

[11] Patent Number: 4,918,160
[45] Date of Patent: Apr. 17, 1990

[54] METHOD FOR PRODUCING PURIFIED POLYCARBONATE RESIN WITH FLUID CONTAINING $CO_2$

[75] Inventors: Shigeo Kondoh; Toshikazu Umemura, both of Osaka, Japan

[73] Assignee: Mitsubishi Gas Chemical Company, Inc., Tokyo, Japan

[21] Appl. No.: 327,889

[22] Filed: Mar. 23, 1989

[30] Foreign Application Priority Data
Mar. 23, 1988 [JP] Japan .................................. 63-67164

[51] Int. Cl.[4] .............................................. C08G 63/62
[52] U.S. Cl. .................................... 528/483; 264/340; 264/345; 528/196
[58] Field of Search ............... 528/483, 196; 264/340, 264/345

[56] References Cited
U.S. PATENT DOCUMENTS
3,668,181  6/1972  Oxenrider .......................... 528/483

FOREIGN PATENT DOCUMENTS
1193240  5/1970  United Kingdom ............... 528/483

Primary Examiner—Harold D. Anderson
Attorney, Agent, or Firm—Sughrue, Mion, Zinn, Macpeak & Seas

[57] ABSTRACT

A method for producing a purified polycarbonate resin is disclosed, comprising contacting a solid polycarbonate resin with a fluid comprising at least 70% by weight of carbon dioxide and having a temperature of 30° to 120° C. and a pressure of at least 10 kg/cm². The method can effectively remove almost all the impurities contained in the polycarbonate resin within a very short period of time, thereby providing highly purified polycarbonate resin materials which are suitably used in the fields of information, electronic and medical industries.

4 Claims, No Drawings

METHOD FOR PRODUCING PURIFIED POLYCARBONATE RESIN WITH FLUID CONTAINING CO₂

FIELD OF THE INVENTION

The present invention relates to a method for producing a purified polycarbonate resin. Specifically, the present invention is concerned with a method in which impurities such as organic impurities, inorganic impurities, solvents, additives, monomers, oligomers, etc. contained in a solid polycarbonate resin obtained by a conventional method and in the form of a powder, pellet or formed article can be efficiently removed from the resin, to produce a purified polycarbonate resin. The purified polycarbonate resin obtained by the method of the present invention has greatly improved stability and the ability not to corrode metals, etc., and, therefore, can most suitably be used in the fields in which removal of impurities is required, such as medical instruments, optical disc substrates, etc.

BACKGROUND OF THE INVENTION

The following methods have been proposed as methods for removing impurities contained in a polycarbonate resin, such as organic impurities, inorganic impurities, solvents, additives, monomers, oligomers, etc.

(1) A method which comprises subjecting a powdery polycarbonate resin to extraction with a mixed solvent of, for example, methylene chloride and toluene as disclosed in, for example, Japanese Patent Publication Nos. 38-16347 and 48-6620;

(2) A method which comprises contacting a polycarbonate resin solution with active carbon as disclosed in, for example, Japanese Patent Publication No. 42-2915;

(3) A method which comprises extracting a polycarbonate resin solution with an aqueous alkaline solution as disclosed in, for example Japanese Patent Publication No. 42-2915; and (4) A method which comprises stirring a molten polycarbonate resin under high vacuum as disclosed in, for example, Japanese Patent Publication No. 42-16079.

However, those methods have the following disadvantages.

In the methods (1), (2) and (3) above, since solvents are used for the purification, contamination of the purified products with the residual solvents and the impurities in the solvents cannot be avoided completely. Further, the application of those three techniques is limited to the purification of polycarbonate resins which are in the stage of powders or earlier stages, and those methods are utterly ineffective in the purification of pellets or formed articles from which the impurities resulting from thermal decomposition in both extrusion and molding and the additives, such as a stabilizer and a releasing agent, which become unnecessary after molding and should be treated as impurities, should be removed. Further, with respect to their purification effects, the methods (1) and (2) are ineffective in the removal of inorganic impurities although effective against organic impurities, monomers and oligomers, while the method (3) can remove substantially monomers only and its application is limited to partial purification.

Moreover, those three methods have another disadvantage that the post-treatments or regeneration treatments of the mixed solvents, active carbon and aqueous alkaline solutions which are discharged after purification, are troublesome and expensive.

The method (4) above is effective in removing solvents, organic impurities and monomers, but unable to remove nonvolatile impurities such as inorganic impurities and oligomers, and also has a defect of quality deterioration of the resins due to heating. Therefore, the method (4) is disadvantageous from the standpoint of a molded article.

Therefore, no method is known at present which can remove various impurities contained in a polycarbonate resin in the stage of solid resins, with a one-step treatment at a high efficiency. Further, from the standpoint of a molded article which is an objective product, no any method is known at present which can remove the impurities without substantially impairing the shape, the surface state, and the like of the molded article.

SUMMARY OF THE INVENTION

The present inventors have made extensive and intensive studies to develop a purification method which can eliminate the disadvantages accompanying the prior art techniques, is effective and can be widely applied. As a result, it has been found that various impurities in a polycarbonate resin can be removed extremely effectively by contacting a polycarbonate resin with a pressurized fluid of carbon dioxide. It has also been found that by selecting the treatment conditions, the impurities can be removed without impairing the shape and surface state of the molded article. The present invention has been completed on the basis of such novel findings.

Accordingly, an object of the present invention is to provide a method for producing purified polycarbonate resins, in which various impurities can be removed from solid polycarbonate resins with a one-step treatment at a high efficiency.

The method for producing a purified polycarbonate resin according to the present invention comprises contacting a solid polycarbonate resin selected from the group consisting of a polycarbonate resin, a resin composition comprising a polycarbonate resin, and a polycarbonate copolymer with a fluid comprising at least 70% by weight of carbon dioxide and having a temperature of 30° to 120° C. and a pressure of at least 10 kg/cm².

In the preferred embodiment, the solid resin is a molded article; the molded article is a medical material and the contact treatment is conducted at a temperature of 30° to 100° C.; and the molded article is an optical disc substrate and is brought into contact with a fluid comprising at least 70% by weight of carbon dioxide and having a temperature of 30° to 100° C. and a pressure of 10 to 200 kg/cm².

DETAILED DESCRIPTION OF THE INVENTION

The constitution of the present invention will be explained below.

A fluid comprising at least 70% by weight of carbon dioxide and having a temperature of 30° to 120° C. and a pressure of at least 10 kg/cm² used in purification of the present invention (hereinafter referred to as "fluid" for simplicity) is either carbon dioxide alone or a mixture of carbon dioxide and at least one other compound and is used as a pressurized fluid having a pressure of 300 kg/cm² or less. Such other compound which is mixed with carbon dioxide is suitably selected according to the natures of impurities to be removed, but can also used for dilution in order to relax the extraction conditions. Preferred examples of such other compounds which is used in combination with carbon dioxide in an amount of 30% by weight or less are compounds having critical temperatures of 300° C. or less and critical pressures of 100 kg/cm² or less. Representative examples thereof are Flon-12 (dichlorodifluoromethane), n-butane, nitrous oxide, sulfur dioxide, methanol, ethanol, diethyl ether, etc. For example, in the case where inorganic impurities are particularly required to be removed effectively, a polar compound such as methanol is mixed with carbon dioxide, while in the case where organic impurities and additives are particularly required to be removed effectively, a nonpolar or weakly polar compound such as n-butane is mixed. Further, nitrogen gas, for example, is appropriately used for dilution.

The extraction or purification of impurities by contact with the fluid proceeds toward the inside from the contact face (surface) of the fluid successively, and becomes rapid by the increase of pressure and the elevation of temperature. Therefore, the extraction or purification conditions are appropriately selected depending on the type and form (material, molded article, or precision molded article) of the polycarbonate resin to be purified. Similarly, the contact time varies depending on the composition, pressure and temperature of the fluid, and the type and form (material, molded article or precision molded article) of the polycarbonate resin to be purified, but is generally selected from the range of 1 to 120 minutes. Further, it is a preferred embodiment to appropriately employ a multistep treatment such that after treating a polycarbonate resin with a gaseous carbon dioxide of 10 to 75.2 kg/cm², the pressure is increased and the polycarbonate resin is treated with super critical carbon dioxide.

In the case of extrusion removing impurities from raw materials for molded article, such as a moldable material, it is efficient to make the contact conditions severe and employ the polycarbonate resin in the form of particles having an average particle size of 1 mm or less. Further, in the case of the molded article, the operation conditions are controlled, while maintaining its shape and surface state, so as to remove impurities from the surface successively and stop the operation at a depth necessary for purification. For example, in the case of a food container, a medical material, etc. which is sufficient if its surface state is maintained in the order of from a visual observation to a microscopic observation, change of the surface state which can be visually confirmed does not occur even at a temperature of about 100° C. under a pressure of about 250 kg/cm², so that it is sufficient only if the degree of purification desired at the practical use is considered. Further, in the case of an optical disc, for example, which is required to maintain the surface state in a submicron order, relatively mild extraction conditions by which grooves on a surface of the substrate are not broken are selected.

The form of the solid polycarbonate resin used in the purification of the present invention is not particularly limited, and can be either a powder, pellet or molded article.

Examples of the polycarbonate resin which can be used in the present invention include a homo- or copolycarbonate resin composition (PC alloy), and a graft copolymer of a polycarbonate resin and a vinyl resin.

Examples of the homo- or copolycarbonate resin include aliphatic, alicyclic or aromatic polycarbonate having at least 20 of a structural unit represented by the formula

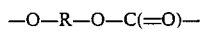

$$-O-R-O-C(=O)-$$

wherein R represents a divalent aliphatic, alicyclic or aromatic hydroxy compound residue. The aromatic polycarbonate is particularly preferred as the polycarbonate.

Examples of the polycarbonate resin composition include resin compositions comprising the polycarbonate and a polyester resin such as polyethylene terephthalate, polybutylene terephthalate, cyclohexanedimethanol/terephthalic acid/isophthalic acid copolymer or cyclohexanedimethanol/ethylene glycol/terephthalic acid copolymer; resin compositions comprising the polycarbonate and a polystyrene, a styrene/maleic anhydride copolymer, a styrene/maleimide copolymer, a styrene/maleic anhydride/maleimide copolymer or a styrene/(meth)acrylic acid ester copolymer.

Examples of the polycarbonate copolymer include graft copolymers comprising the polycarbonate and a polystyrene, a styrene/maleic anhydride copolymer, a styrene/maleimide copolymer, a styrene/maleic anhydride/maleimide copolymer or a styrene/(meth)acrylic acid ester copolymer.

Examples of the organic impurities, inorganic impurities, solvents, additives, monomers and oligomers contained in the above-described polycarbonate resin include solvents and catalysts, both of which are used in the reaction; monomers remaining unreacted; reaction by-products; impurities which are formed in the reaction from the raw materials, solvents, materials of the reaction vessels, etc.; stabilizers, releasing agents, etc., which are used for extrusion, molding, etc.; and the like.

Specific examples of the impurities which are removed according to the purification method of the present invention are given below, referring to a bisphenol A homopolycarbonate resin produced by interfacial polymerization which is presently a main method in the commercial production. Examples of the organic impurities are cumarone compounds, triphenols, etc., which are contained as impurities in the bisphenol A used as the raw material; isopropenyl phenol, its dimer, etc., which result from thermal decomposition in the course of both extrusion and molding and are contained in the resin; and oils which contaminate the resin through the overall production process. Those impurities are contained in the resin in a total amount of around 0.01 wt %, and are neutral or weakly-acidic organic impurities which are slightly soluble and slightly volatile and are difficult to remove by the prior art techniques. Examples of the inorganic impurities include $Na^+$, $Cl^-$, $PO_4^{3-}$, $SO_3^{2-}$, etc., which result from the thermal decomposition in extrusion and molding of both residues in a conventional production or purification process and added inorganic acid ester-type stabilizers which and are contained in the resin, or which are present in the environment and contaminate the resin at the time of the handling of the resin.

Solvents which can be removed are solvents which are used in the conventional production and processing of the resin and remain unremoved from the resin. Examples thereof include methylene chloride, chloroform, carbon tetrachloride, toluene, cyclohexane, heptane, acetone, isopropyl alcohol, benzene, etc.

Examples of the additives which can be removed include antioxidants such as pentaerythritoltetrakis[3-(3,5-di-t-butyl-4-hydroxyphenyl)propionate](trade name; Irganox 1010), releasing agents such as butyl stearate, stearyl monoglyceride, silicone oil, etc.

Further, examples of monomers which can be removed include bisphenol A which remains unreacted after polymerization, or results from thermal decomposition or hydrolysis in extrusion, molding and processing and contaminates the resin; and chain terminators such as phenol, p-t-butylphenol, etc.

Oligomers which can be removed are those having a low degree of polymerization, such as 10 or less. The removal efficiency can increase as the degree of polymerization decreases. Particularly, oligomers having a degree of polymerization of 3 or less can be removed effectively.

Impurities which are difficult or impossible to remove by the purification method of the present invention are insoluble salts such as $Ca_3(PO_4)_2$ and $BaSO_4$, a fine piece of a metal, etc. However, such impurities are limited in kinds, and it is rare that such impurities contaminate polycarbonate resins.

The method for producing a solid purified polycarbonate resin according to the present invention can be practiced by, for example, placing a solid polycarbonate resin into a pressure vessel for purification or contact treatment, and introducing thereinto the above-described fluid, whereby the resin is brought into contact with the fluid.

The polycarbonate resin purified by the abovedescribed method is taken out of the contact vessel after the fluid has been discharged. According to need, the resulting purified resin is heated at a temperature of 100° C. or lower under atmospheric pressure or reduced pressure to remove the fluid used.

The fluid used is transferred from the contact and extrusion vessel to a separator, where most of the dissolved impurities are removed, and the resulting fluid is then discharged or reused by recycle operation. In the case where the fluid is recycled, it is preferred that the fluid be subjected to purification treatments such as a gas/liquid separation, an activated carbon adsorption or the like with a pressure change. In the case of a molded article such as an optical disc substrate containing less impurities, it is particularly preferred to conduct adsorption purification treatment Explaining the production steps of the present invention by reference to an optical disc substrate, the present invention is practiced by combining with the following unit apparatuses as the main units.

(1) Contact treatment tank

This is a treatment tank which contact treats a fluid and an optical disc substrate under prescribed conditions and is generally equipped with a heat medium jacket for temperature control. The tank has an auxiliary member to support optical disc substrates so as not to let them each other, an inlet and outlet for the substrates, and if necessary, separated chambers for introduction and withdrawal of the substrates. The tank also has an opening for introducing a fluid and an opening for discharging the fluid.

(2) Reducing valve

In order to remove a slight amount of extraction impurities from a fluid used for treatment, a fluid is pressure-reduced prior to introducing the fluid into an impurity separating tank (3) described below. The valve may be provided on an inlet of the impurity separating tank.

(3) Impurity separating tank

A fluid used in treatment operation is subjected to pressure reduction to perform make gas/liquid separation or subjected to contact treatment with an adsorbent such as activated carbon to remove the extracted impurities. The tank generally has an activated carbon layer therein. In the case of a continuous operation, it is preferred to provide a plurality of impurity separating tanks.

(4) Compressor

In the general operation of the present invention, a piston-type compressor is used.

(5) Filter

If solid impurities or the like are present in a fluid, a disc surface tends to be stained. Therefore, the fluid which is introduced into the contact treatment tank (1) is passed through a filter to purify the same.

(6) Piping

Such is used for a liquid to flow in the order of contact treatment tank (1)→reduced valve (2)→impurity separating tank (3)→compressor (4)→filter (5)→contact treatment tank (1), and it is particularly preferred to select pipes which do not generate dust.

(7) Auxiliary tank

This tank is appropriately used to stock a fluid such as carbon dioxide.

Due to their excellent properties such as transparency and heat resistance, polycarbonate resins have recently been utilized increasingly to produce information-recording discs and as materials for medical apparatuses. However, considerable efforts are being made to decrease the amount of various impurities or additives contained in the resins for use in such fields, because the functions, reliability and safety of the products are seriously impaired if various impurities or additives contained in the resins bleed out or decompose to appear on the resin surfaces during the use of the products.

According to the method of the present invention, almost all the impurities contained in a polycarbonate resin can be effectively removed by an extremely short-time treatment without leaving the treating agent in the resin, as will be described in the Examples given below. Hence, the present invention makes it possible to provide highly purified polycarbonae resin materials which are suitably used in the fields of information, electronic and medical industries.

Moreover, the method of the present invention is applicable to resins in the stage of molded articles. The surface layers extending to a depth of about 0.1 mm from the surface can be easily purified without impairing the surfaces in any way in the level of visual observation or microscopic observation. Further, by selecting conditions milder than the surface unevenness on the submicron order, impurities and the like on the surface layer can be sufficiently removed. Therefore, the method of the present invention is very effective in the fields where impurities in the surface layers of the resins cause problems, for example, in maintaining the performances of the recording layer of an information-recording disc and in ensuring the safety of a material for a medical apparatus over a long period of time.

The present invention will be explained in more detail by reference to the following Examples and Comparative Examples, which should not be construed to be limiting the scope of the invention.

In Examples and Comparative Examples, the analyses of polycarbonate resins before and after the contact purification treatments were carried out according to the following methods.

Solvents, Additives and Other Organic Impurities

A sample in an evacuated sealed tube was heated at 300° C. for 30 minutes, and the pressure in the sealed tube was adjusted to normal pressure with $N_2$ gas. The gas in the tube was then analyzed by means of a gas chromatograph (GC).

Monomers and Oligomers

A sample was dissolved in chloroform, and the resulting solution was analyzed by means of a gel-permeation chromatograph (GPC) equipped with a column for the low molecular weight range and an ultraviolet absorption detector.

Inorganic Impurities

A sample was dissolved in purified methylene chloride and the resulting solution was divided into two parts. One was subjected to extraction with dilute hydrochloric acid, followed by determination of metals such as $Na^{30}$, $Ca^{2+}$, etc., by atomic-absorption spectroscopy. The other was subjected to extraction with pure water, followed by determination of anions such as $PO_4^{3-}$, $Cl^-$, etc., with an ion chromatograph.

EXAMPLE 1

Into a 1 liter three-necked flask equipped with a stirrer, a tube for phosgene blowing and a thermometer were introduced successively, with stirring, 600 ml of pure water, 43.6 g of sodium hydroxide, 0.1 g of sodium hydrosulfite, 250 ml of methylene chloride and 91.2 g of bisphenol A (hereinafter referred to as "BPA"). While the temperature in the flask was being maintained between 15° and 20° C. by external cooling, 45.0 g of phosgene was blown, with stirring, through the resulting mixture over a period of 30 minutes. Thereafter, 2.0 g of p-tert-butylphenol (hereinafter referred to as "PTBP") and 0.1 g of triethylamine (hereinafter referred to as "TEA") were introduced into the flask, and polymerization was allowed to proceed with stirring for about 1 hour.

After completion of the polymerization, the lower layer, i.e., the resin solution layer, was separated out, washed once with pure water, subsequently neutralized with 100 ml of a 10% phosphoric acid solution, and then washed three times with pure water. The resulting resin solution was heated to distill off the methylene chloride (hereinafter referred to as "MC"), thereby obtaining a resin. The thus-obtained resin was ground and then dried at 120° C. for 3 hours to obtain a powdery polycarbonate resin having a viscosity average molecular weight of $2.5 \times 10^4$.

Two samples, each composed of 10 g of the resulting powder, were separately placed in the extraction cartridge in an apparatus for super critical fluid extraction/super critical fluid chromatography (SFE/SFC), Type SUPER-100 manufactured by Japan Spectroscopic Co., Ltd., and subjected to extraction with two kinds of super critical fluids, respectively, i.e., 100% carbon dioxide (hereinafter referred to as "$CO_2$") and a mixture of 90 wt % $CO_2$ and 10 wt % diethyl ether (hereinafter referred to as "DEE"), at a temperature of 40° C. under a pressure of 250 kg/cm$^2$ for 5 minutes, in both cases.

Before and after the extraction procedures as described above, the polycarbonate resins were analyzed for main impurities. The analytical data obtained are shown in Table 1.

COMPARATIVE EXAMPLE 1

To 10 g of the powdery polycarbonate resin as obtained in Example 1 above was added 50 ml of a mixed solvent of 70% by volume toluene and 30% by volume MC, and extraction was conducted for 60 minutes with occasional shaking. Subsequently, the resulting powder was recovered by suction filtration, and dried under vacuum at 120° C. for a day and night.

The analytical data for the thus-obtained powder are shown in Table 1.

TABLE 1

(Powder extraction)

| Main impurities | | Before purification | Example 1 | | Comparative Example 1 |
|---|---|---|---|---|---|
| Kind | (unit) | | $CO_2$ (100%) | $CO_2$ = 90 DEE = 10 | toluene = 70 MC = 30 |
| BPA | (ppm) | 60 | 1 | 2 | 10 |
| 1.5-Mer*1 | (wt %) | 0.54 | 0.04 | 0.06 | 0.20 |
| Dimer*2 | (wt %) | 1.35 | 0.17 | 0.20 | 0.75 |
| MC | (ppm) | 7600 | 4 | 5 | 2250 |
| $PO_4^{3-}$ | (ppm) | 2.5 | 1.5 | 1.0 | 2.4 |

*1 1.5-mer: The amount of an oligomer which is composed of BPA and PTBP bonded with each other through a carbonate group.
*2 Dimer: The total amount of an oligomer composed of two BPA molecules bonded with each other through a carbonate group and having a hydroxy group at each end, and an oligomer composed of the above-described oligomer and TPBP bonded to one or each end thereof through a carbonate group.

Table 1 shows that, in Example 1 most of the various impurities were removed in a short time to obtain a highly purified polycarbonate resin. In contrast, in Comparative Example 1, although BPA was considerably decreased, the oligomers represented by the 1.5-mer and dimers were decreased only by about half, showing that its effect was insufficient.

EXAMPLE 2

With 5 kg of a powder of a commercially available polycarbonate resin, Iupilon S-3000 (trade name, manufactured by Mitsubishi Gas Chemical Company, Inc.) were blended 15 g of butyl stearate and 1.5 g of Irganox 1010. The resulting blend was formed into pellets of 3 mm in both diameter and length by means of an extruder having a screw of 40 mm in diameter.

Using each of 10 g of the above-obtained pellets and a 20 mm × 50 mm test piece having a thickness of 3 mm, which had been prepared from the above-obtained pellets by injection-molding, super critical fluid extraction with 100% $CO_2$ was carried out for 30 minutes in each case in the same manner as in Example 1.

Before and after the extraction, the pellets and the test piece were analyzed for main impurities. The analytical data obtained are shown in Table 2.

TABLE 2

| Main impurities | | (Molded article extraction) | | | |
|---|---|---|---|---|---|
| | | Pellets | | Test piece | |
| Kind | (unit) | Before extraction | After extraction | Before extraction | After extraction |
| BPA | (ppm) | 22 | 3 | 75 | 18 |
| Butyl stearate | (wt %) | 0.27 | 0.02 | 0.25 | 0.04 |
| Irganox 1010 | (ppm) | 265 | 30 | 230 | 35 |

EXAMPLE 3

The same test piece as prepared in Example 2 above was placed into the same extraction cartridge in the apparatus for super critical fluid extraction as used in Example 1, and subjected to super critical fluid extraction with 100% $CO_2$ at a temperature of 45° C. under a pressure of 200 kg/cm² for 5 minutes.

The analysis of the resulting test piece before and after the extraction treatment was carried out with respect to the whole test piece and its surface layer obtained by scraping the surface of the test piece to a depth of 0.1 mm. The results obtained are shown in Table 3.

Before and after the extraction treatment, the surfaces of the test piece were visually observed and were found to be completely smooth and have a haze value thereof which was unchanged. Further, the results in Table 3-1 show that the impurities were removed in an extremely short time.

TABLE 3-1

| Main impurities | | (Molded article extraction) | | | |
|---|---|---|---|---|---|
| | | Whole test piece | | Surface layer (0.1 mm) | |
| Kind | (unit) | Before extraction | After extraction | Before extraction | After extraction |
| BPA | (ppm) | 75 | 35 | 90 | 2 |
| Butyl stearate | (wt %) | 0.25 | 0.14 | 0.42 | 0.01 |
| Irganox 1010 | (ppm) | 230 | 140 | 340 | 15 |

COMPARATIVE EXAMPLE 2

Each of three test pieces which were the same as prepared in Example 2 above was separately placed into a beaker, and 50 ml each of isopropyl alcohol (IPA), diethyl ether (DEE) and n-heptane (nHP) were added to the three test pieces, respectively, followed by extraction at room temperature for 24 hours. Thereafter, the 0.1 mm-thick surface layer of each of the resulting test pieces were analyzed in the same manner as in Example 3. The results obtained are shown in Table 4.

The results in Table 3-2 show the following. In the case of DEE, its extracting effect was relatively good, but the haze value of the surface layers of the test piece was changed. In other two cases, the impurity-removing effects were insufficient, although no change of the surface layers was observed visually.

TABLE 3-2

| Main impurities | | (Molded article extraction) | | | |
|---|---|---|---|---|---|
| | | Before extraction with solvent | After extraction with solvent | | |
| Kind | (unit) | | IPA | DEE | nHP |
| BPA | (ppm) | 90 | 70 | 30 | 85 |
| Butyl stearate | (wt %) | 0.42 | 0.37 | 0.12 | 0.39 |
| Irganox 1010 | (ppm) | 340 | 270 | 50 | 300 |
| Surface appearance | (visual observation) | — | no change | haze value changed | no change |

EXAMPLE 4

With a powder of a commercially available polycarbonate resin, Iupilon S-2000 (trade name, manufactured by Mitsubishi Gas Chemical Company, Inc.) were blended 0.3% of pentaerythritholtetrakisstearate and 0.05% of trinonylphenylphosphite. The resulting blend was formed into pellets of 3 mm in both diameter and length with an extruder having a screw of 40 mm in diameter.

The resulting pellets were injection molded into a cylindrical molding (thickness 2.0 mm, inner diameter 40 mm, length 300 mm) for housing of an artificial dialyzer.

The molding was contact treated using a fluid of 100% $CO_2$ at a temperature of 100° C. under a pressure of 100 kg/cm² for 5 minutes.

The molding before and after the treatment was subjected to a dissolution test based on the Recognition Standard of the Dialysis-type Artificial Kidney in the following manner.

15.0 g of the molding was washed with water and dried at room temperature. The molding was placed in 500 ml inner volume glass vessel which was afford to a glass vessel test for injector according to Japanese Medical Standard or an alkali extraction test. About 300 ml of water was added to the vessel and the vessel sealed. The vessel was heated at 121° C. for 1 hour using a high pressure steam pasteurizer and allowed to stand at room temperature. Water in the vessel was transferred into a separate vessel, and fresh water was added to the separate vessel to make 300 ml, thereby preparing a testing solution.

The same procedure as above was repeated except for using the molding (Reference Test).

20 ml of the testing solution obtained above was introduced into Erlenmeyer flask, and 20.0 ml of 0.01 N potassium permanganate (KMnO$_4$) solution and 1 ml of diluted hydrochloric acid were added to the flask. The resulting mixture was boiled and cooled. 0.10 g of potassium iodide was added to the flask. The flask was sealed, shaked and then allowed to stand for 10 minutes. The mixture was titrated with 0.01 N sodium thiosulfonate (Indicator: starch reagent solution, 5 droplets). Reference Test was conducted in the same manner as above.

The results obtained are shown in Table 4 below.

TABLE 4

|  | Before Treatment | After Treatment |
|---|---|---|
| Amount of organic reducing materials to be oxidized by KMnO$_4$ in terms of amount of 0.01N KMnO$_4$ consumed (ml) | 0.05 | 0.01 |

EXAMPLE 5

Bisphenol A polycarbonate homopolymer having a molecular weight of 16,000 was injection molded to obtain an optical disc substrate having spiral grooves on one side, a thickness of 1.2 mm and a diameter of 130 mm.

The resulting substrate contained 20 ppm of MC, 50 ppm of unreacted BPA and 0.5 ppm of Cl$^-$ ion, and also contained 0.04% of stearyl monoglyceride which was a releasing agent.

The substrate was contact treated using a fluid of 100% CO$_2$ at a temperature of 45° C. under a pressure of 100 kg/cm$^2$ for 5 minutes.

After contact treatment, the substrate was dried at 100°0 C. and atmospheric pressure for 1 hour under a clean environment. Tb/Fe/Co alloy was deposited on the substrate by sputtering to form a magneto optical recording layer, and a photocurable acrylic resin was coated thereon, followed by curing with UV light.

The resulting optical disc was allowed to stand at 80° C. and 90% RH for 300 hours, and the number of defects of 30 μm or more present on the entire surface of the optical disc was examined. The examination of defects on the optical disc was made using Automatic Defect Checker Model I, manufactured by Japan Electro-Optics Co.

The results obtained are shown in Table 5 below.

COMPARATIVE EXAMPLE 3

The same procedure as in Example 5 above was repeated except that in place of the contact treatment with CO$_2$ fluid, the optical disc substrate was washed with water and then subjected to a steam bath washing of IPA and Flon 113.

The results obtained are shown in Table 5 below.

TABLE 5

| | Number of Defects/Substrate | | | |
|---|---|---|---|---|
| | Retention Time | | | |
| | 0 | 100 | 200 | 300 |
| Example 5 | 55 | 60 | 75 | 85 |
| Comparative Example 3 | 58 | 120 | 530 | 2,350 |

EXAMPLE 6 Styrene and maleic anhydride were grafted onto Bisphenol A polycarbonate homopolymer obtained by using an unsaturated vinyl compound as a terminator to prepare a polycarbonate/styrene/maleic anhydride graft copolymer. The graft copolymer had a glass transition point of 143° C.

The graft copolymer was injection molded to obtain optical disc substrates having spiral grooves on one side thereof and having a thickness of 1.2 mm and a diameter of 130 mm.

The substrates contained 15 ppm of MC and 0.5 ppm of Cl$^-$ ion, and also contained 0.2% of behenyl behenate.

The substrates were each contact treated with a fluid comprising a blend of CO$_2$ and diethyl ether (Et$_2$) or nitrogen gas (N$_2$) shown in Table 6 below under the conditions shown in Table 6 below. Thereafter, each of the substrates was treated in the same manner as in Example 5.

The results obtained are shown in Table 6 below.

TABLE 6

| | Fluid | | Contact Conditions | | | Number of 30 μm or more defects per substrate | |
|---|---|---|---|---|---|---|---|
| Run No. | CO$_2$ (%) | Other Fluid/ Amount (%) | Temp. (°C.) | Pressure (kg/cm$^2$) | Time (min) | Initial | After test |
| 1 | 100 | — | 40 | 100 | 5 | 70 | 75 |
| 2 | 100 | — | 40 | 150 | 3 | 70 | 77 |
| 3 | 100 | — | 60 | 50 | 30 | 70 | 115 |
| 4 | 80 | Et$_2$O/20 | 60 | 100 | 10 | 73 | 83 |
| 5 | 70 | N$_2$/30 | 50 | 150 | 10 | 75 | 78 |
| 6 | 100 | — | 20 | 150 | 30 | 75 | 1,570 |
| 7 | 100 | — | 10 | 200 | 60 | 70 | 1,850 |
| 8 | 100 | — | 120 | 200 | 5 | Grooves on the surface of substrate disappeared | |
| 9 | 100 | — | 50 | 250 | 5 | Grooves on the surface of substrate disappeared | |

While the invention has been described in detail and with reference to specific embodiments thereof, it will be apparent to one skilled in the art that various changes and modifications can be made therein without departing from the spirit and scope thereof.

What is claimed is:

1. A method for producing a purified polycarbonate resin, which comprises contacting a solid polycarbonate resin selected from the group consisting of a polycarbonate resin, a resin composition comprising the polycarbonate resin in combination with a polyester resin selected from the group consisting of polyethylene terephthalate, polybutylene terephthalate, cyclohexanedimethanol/terephthalic acid/isophthalic acid copolymer or cyclohexanedimethanol/ethylene glycol/terephthalic acid copolymer, a polystyrene, a styrene/maleic anhydride copolymer, a styrene/maleimide copolymer, a styrene/maleic anhydride/maleimide copolymer or a styrene/(meth)acrylic acid ester copolymer, and a polycarbonate copolymer selected from the group consisting of graft copolymers comprising the polycarbonate and a polystyrene, a styrene/maleic anhydride copolymer, a styrene/maleimide copolymer, a styrene/maleic anhydride/maleimide copolymer and a styrene/(meth)acrylic acid ester copolymer, with a fluid comprising at least 70% by weight of carbon dioxide and having a temperature of 30° to 120° C. and a pressure of at least 10 kg/cm$^2$.

2. A method as claimed in claim 1, wherein the solid polycarbonate resin is a molded article.

3. A method as claimed in claim 2, wherein the molded article is a material for a medical apparatus, and is contacted with the fluid at a temperature of 30° to 110° C.

4. A method as claimed in claim 2, wherein the molded article is an optical disc substrate, and is contacted with a fluid comprising at least 70% by weight of carbon dioxide and having a temperature of 30° to 100° C. and a pressure of 10 to 200 kg/cm$^2$.

* * * * *